INVENTOR
ARTHUR M. KELLER
BY
Ed Greenewald
ATTORNEY

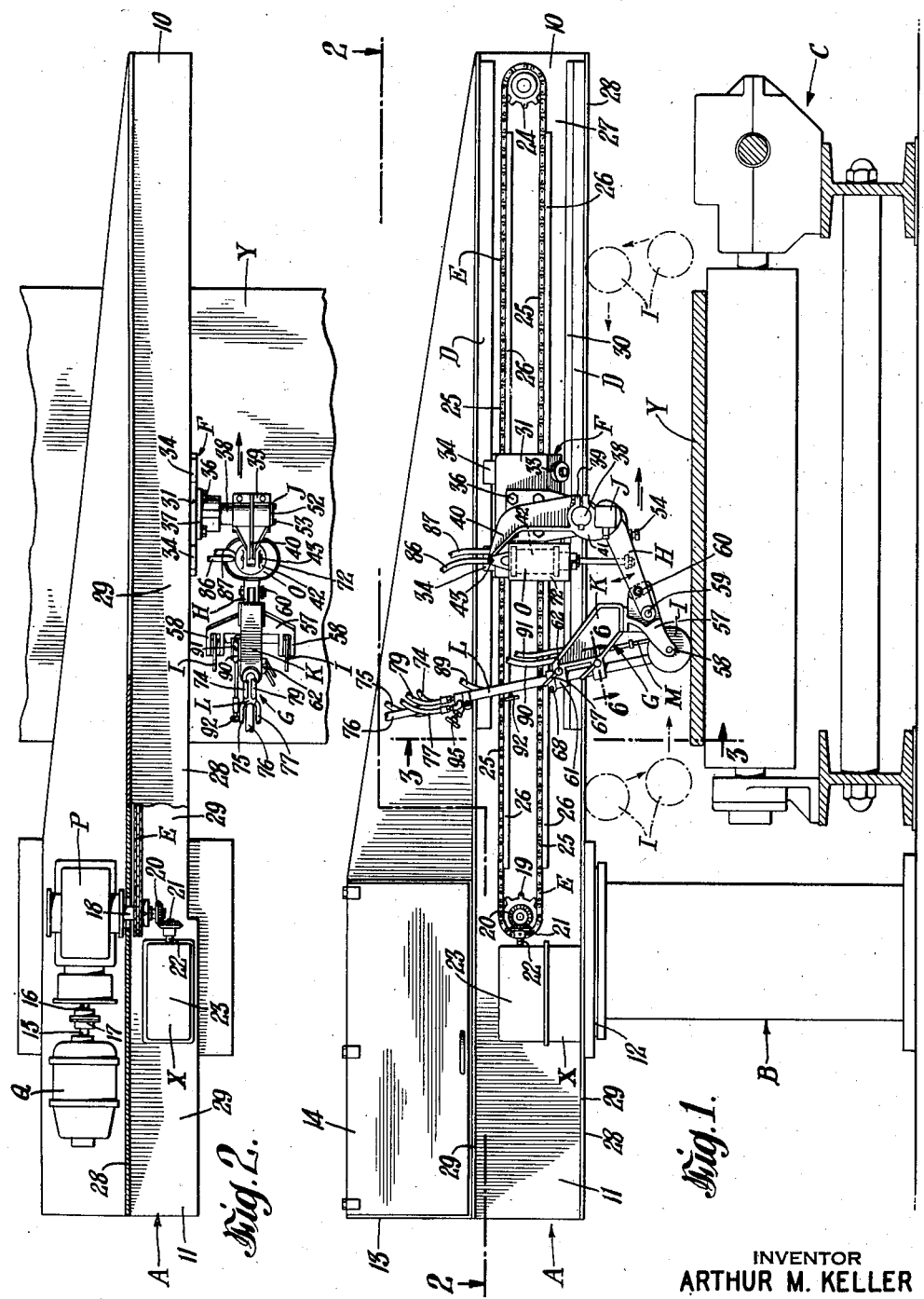

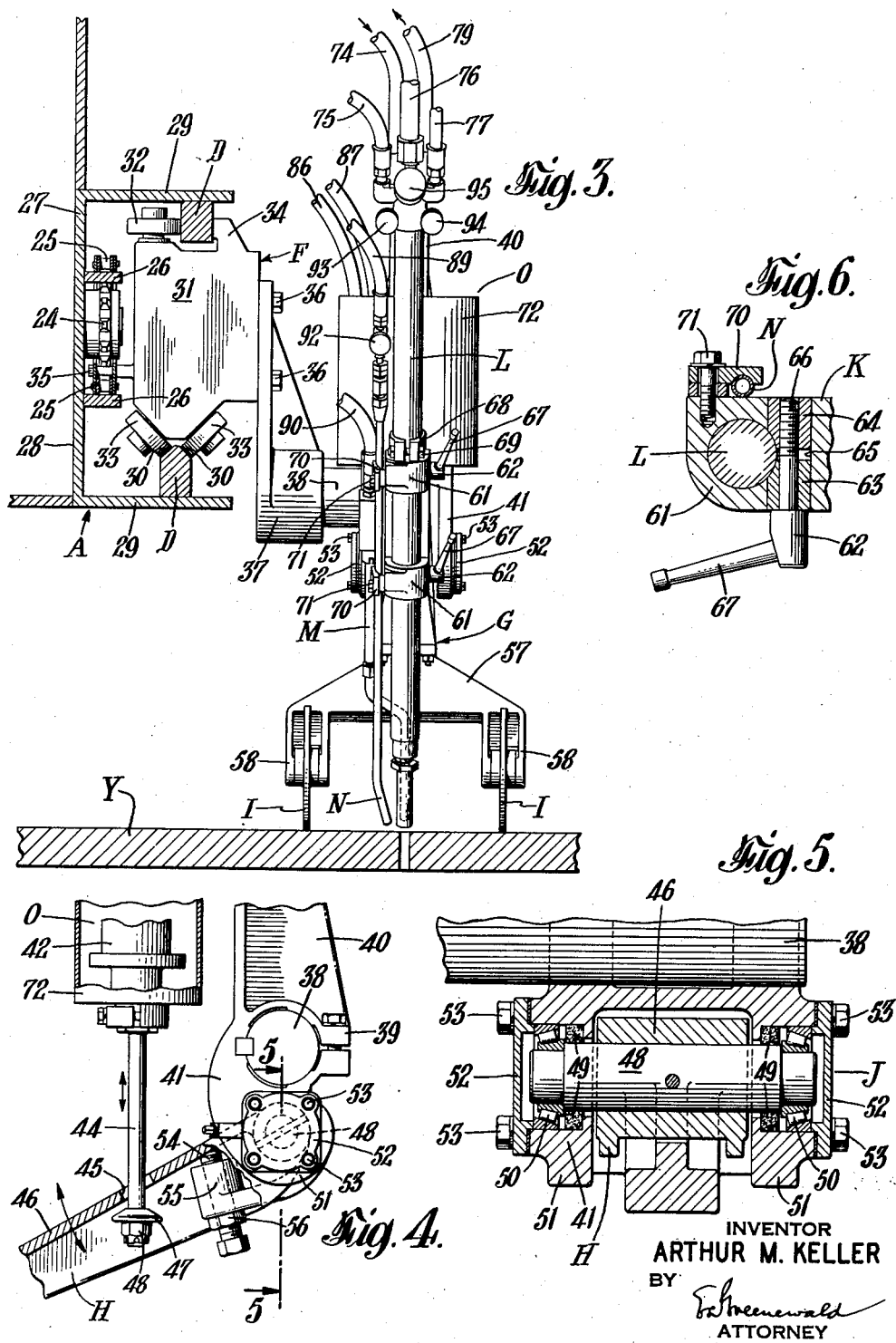

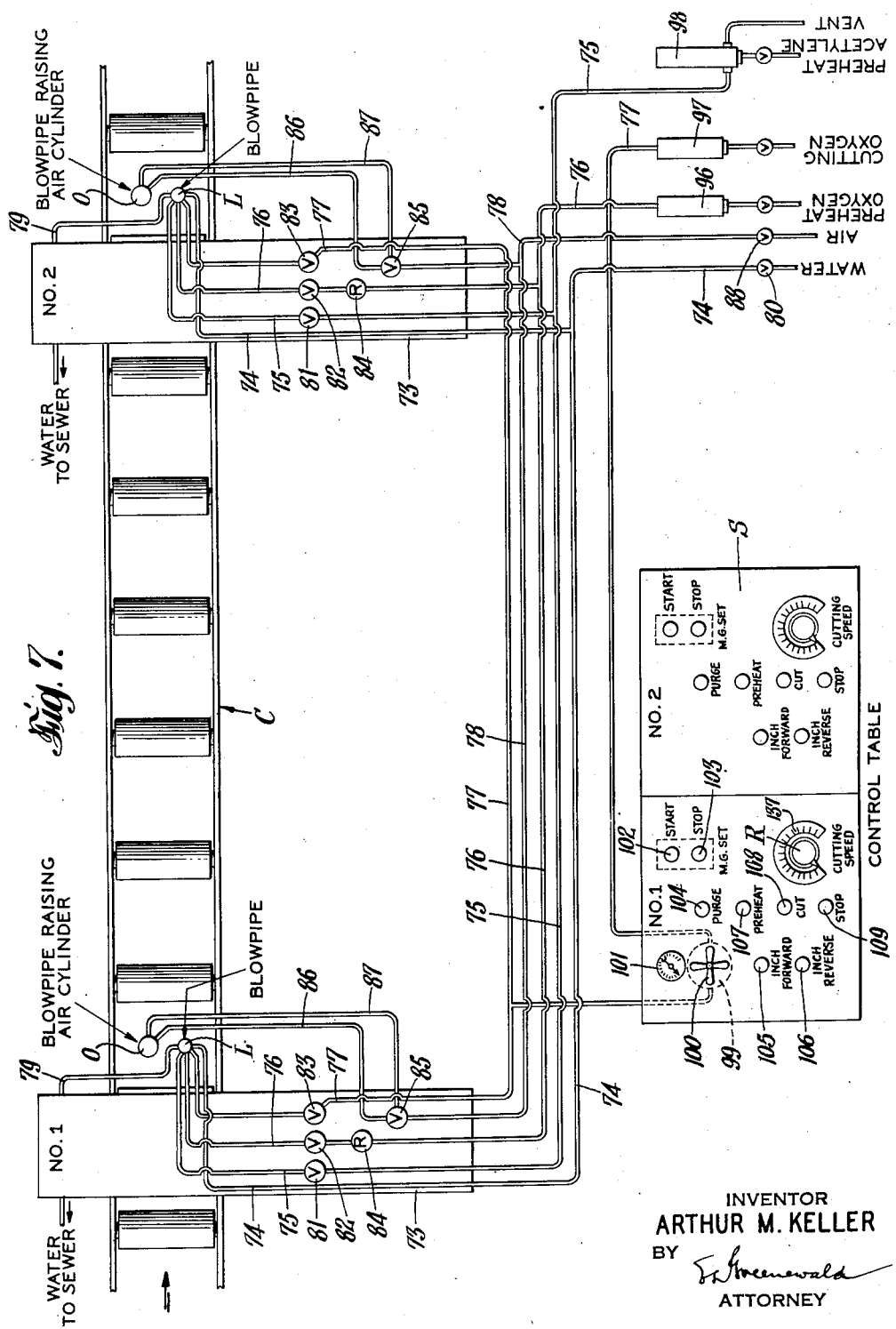

Patented June 13, 1950

2,511,591

UNITED STATES PATENT OFFICE 2,511,591

BLOWPIPE CUTTING APPARATUS

Arthur M. Keller, Livingston, N. J., assignor to The Linde Air Products Company, a corporation of Ohio Continuation of application Serial No. 472,449, January 15, 1943. This application May 30, 1945, Serial No. 596,787

2 Claims. (Cl. 266—23)

This application is a continuation of application Serial No. 472,449, filed January 15, 1943, now abandoned, for Blowpipe cutting apparatus by Arthur M. Keller.

This invention relates to apparatus for thermochemically cutting ferrous metal and the like with oxidizing gas, and more particularly to automatic plate-severing machines.

The rate of work travel along a roll table in steel mills has sometimes been a bottleneck due to stoppages for cutting lengths of the billets, slabs or plates. Mechanical shears are more rapid but more expensive, and leave the cut ends of the work distorted. Thermochemical cutting on the other hand, while slower is frequently preferred because of the elimination of the disadvantages mentioned above as being inherent in mechanical shears. A hand operated blowpipe is not convenient for cutting very hot work. A machine for thermochemically cutting slabs or bars has been suggested but faster operation has been desired. Another suggestion, though not for use with the roll table, has been a plurality of blowpipes mounted from a long beam moved with the blowpipes in cutting, but open to the objection that the beam is cumbersome for substantial spacing of the blowpipes and the suggestion is not adapted for use in a rolling mill.

In this invention these disadvantages have been eliminated and the travel of the work from the roll table has been expedited. It has also been possible to apply this invention in those steel mills having roll tables located close beside one another.

Specifically one operator is now enabled to control a plurality of cutting blowpipes at spaced distances along an elongated work piece by having him control the substantially simultaneous cutting operation of each blow pipe. Each such blowpipe is preferably mounted separately from one side of the roll table. Much of the cutting cycle may be automatic in response to a distance controlled limit switch after the cycle has been manually started. To facilitate operation of work which may be longitudinally bent or curved within the limits of the roll table, it is possible to inch each blowpipe in either direction to a starting position that may be out of alignment with the rest of the blowpipes.

An object is to expedite travel of the work from the roll table by stopping it less frequently when short lengths are to be cut. Another object is to enable this advantage to accrue when hot work is being handled. A further object is to enable such expedition in roll table operation to be applied in steel mills having roll tables arranged laterally close together. A still further object of the invention is to provide a machine for thermochemically cutting steel slabs and plate sections the shape of which is such that they are difficult to cut with a mechanical power cutter, said machine having a nicely adjustable cutting speed, a plate-riding device that is automatically elevated at the end of its work severing stroke and returned to an initial position, and cutting blowpipe means to which preheat and cutting gases are supplied during such work-severing stroke and automatically shut-off at the completion thereof. Yet another object is to provide remote control means for operating one or a plurality of such machines in unison, including a single adjustable means for precisely setting the cutting speed of each of the machines to a common predetermined value, so that work of a given thickness may properly be cut by all said machines operating separately or in unison.

Referring to the drawings:

Fig. 1 is a view mainly in side elevation of a plate cut-off machine exemplifying the invention;

Fig. 2 is a plan view partly in section taken on line 2—2 of Fig. 1;

Fig. 3 is a fragmentary view partly in vertical section taken on line 3—3 of Fig. 1;

Fig. 4 is a fragmentary view partly in section and partly in side elevation of the blowpipe unit;

Fig. 5 is a view mainly in section taken on line 5—5 of Fig. 4;

Fig. 6 is a sectional view taken on line 6—6 of Fig. 1;

Fig. 7 is a schematic diagram of two cut-off machines associated with a single plate conveyor table;

Figure 8:
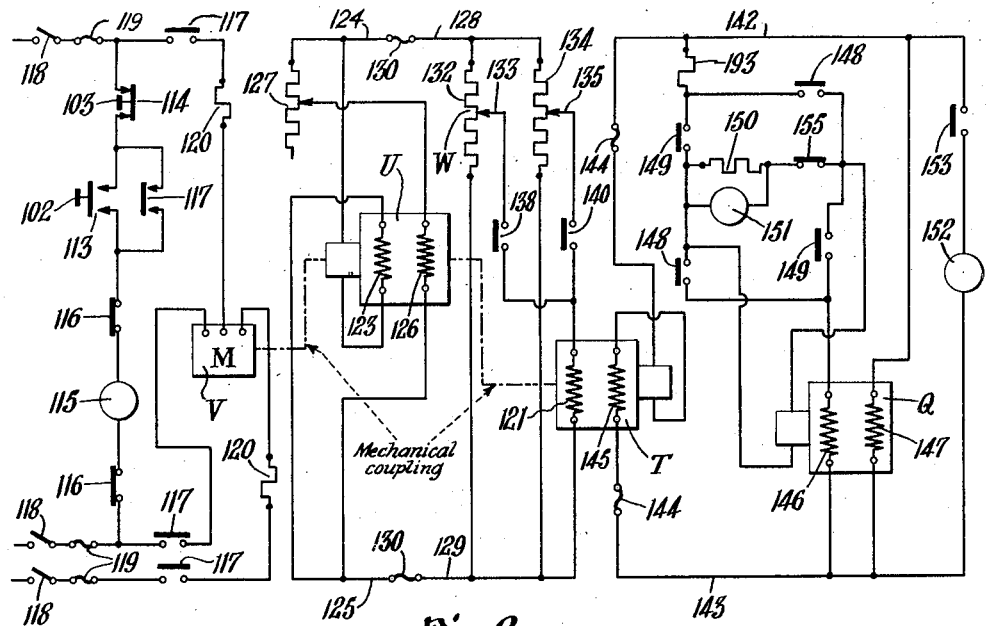
Fig. 8 is a wiring diagram of the motor-generator set and one carriage driving motor.

Referring particularly to Figs. 1 to 6, a box-type cross member or support A is rotatably mounted on a pedestal B located beside a work (plate) conveyor table C. Within one side of the cross-member A are disposed longitudinal ways or tracks D and a roller chain E, the reaches of the chain E extending in parallel relation to the tracks. Attached to the chain E is a blowpipe carriage F which rolls upon and is guided by the tracks D. To the blowpipe carriage F is attached a blowpipe unit G including a work-riding device H having two wheels I; bearing J; a bracket K adapted to accommodate a cutting blowpipe L, an auxiliary preheat blowpipe M and a pilot light burner N; and a shielded double-acting pneumatic motor O for raising and lowering the work-riding device H.

The roller chain E is driven through a speed reducer P by a driving motor Q, the speed of such motor being infinitely adjustable through a ratio of the order of 8 to 1 or greater speed, by control means including a knob R on a control table S, Fig. 7. The driving motor Q is energized by means including a generator T, Fig. 8, having an exciter U, the generator and exciter being driven by a motor V. The armature voltage of the driving motor Q, and hence its speed, is varied by adjusting a rheostat W, Fig. 8, in the field circuit of the generator T, which rheostat is connected to the knob R. Current to one or more carriage driving motors Q may thus be supplied by one motor-generator set VT and in this manner, the speed of a plurality of similar machines No. 1 and No. 2, Fig. 7, is adjusted by the single field rheostat W.

When a cut is completed by the blowpipe unit G, automatic means including a traveling nut-type limit-switch device X, which is driven by the motor Q, causes all gases to be shut off, the blowpipe unit G to be raised to a position above work Y on the table C, and reverses the driving motor Q at its maximum speed. When the unit G reaches its fully retracted position, the device X causes the motor to stop and the unit G to be lowered to an initial position spaced from the work Y.

The support A comprises a portion 10 which extends across the table C at a predetermined distance thereabove, and a portion 11 which extends in the opposite direction so as to counterbalance the portion 10. The support A consists of fabricated metal plates, as shown, and is mounted to turn horizontally in suitable bearing means 12 on the pedestal B, but if desired it may comprise a beam supported at both ends by fixed or movable members so that the beam can be moved longitudinally or transversely or both with respect to the conveyor table C, in order to cause the blowpipe unit G to travel either at right angles or obliquely of the direction of movement of the work Y on the table C, or in order to tilt the path of travel of the carriage F from the horizontal. The motor Q and speed reducer P are disposed on the support A away from the table C so as to protect them from the heat of the work Y which may be at a rolling temperature during the severing action of the machine. The housing may be provided with any suitable heat insulation, if desired. Shafts 15 and 16 of the motor Q and speed reducer P are connected by a flexible coupling 17.

The speed reducer drives a shaft 18 on which is keyed a driving sprocket 19 for the chain E, and a bevel gear 20 which meshes with a bevel gear 21 keyed to shaft 22 of the limit-switch device X. The latter is disposed within a suitable box 23 mounted on the support A. A driven sprocket 24 for the chain E is rotatably mounted on the support A near the outer end of portion 10, so that the work severing and return strokes of the carriage F are of sufficient length to cut any width of work Y on the table C, the driving motor Q being of the reversible type for advancing and retracting the carriage F through the chain E. The longitudinal reaches 25, 25 of the chain E slide on longitudinal shelves 26, 26 secured to a web 27 of a laterally opening channel member 28 of the support A. The channel member 28 has flanges 29, 29 on the inner sides of which are secured the tracks D, D, the upper track being rectangular in cross-section, and the lower track having a tapered top to provide inclined treads 30, 30, Fig. 3.

The carriage F comprises a body 31 which is made to travel within the channel member 28 and is provided with rollers 32 and 33 bearing on the inner side of the upper track, and the inclined treads 30 of the lower tracks, respectively. Uprights 34 on the body 31 cooperate with the outer side of the upper track to prevent inward tilting of the body 31 with respect to the channel member 28. The body 31 is connected to the lower reach of the chain E by means including a stud 35 which projects from the body 31. Connected to the body 31 by screws 36 is a bracket 37 including a short cylindrical bar 38 on which is keyed a member 39 having an upwardly and rearwardly extending portion 40 for supporting the pneumatic device O, and a downwardly extending portion 41 for supporting the work-riding device H. The pneumatic device O comprises a cylinder 42 hung from the portion 40 by a pin 43 so that the device O is free to swing about such pin. Within the cylinder is a double-acting piston to which is connected a depending rod 44. The lower end portion of the rod 44 extends through an opening 45 in an arm 46 of the work-riding device H, and is provided with a ring 47 held in place by a nut 48 for engaging the arm 46 when the rod 44 is raised to swing upwardly the work-riding device H.

The arm 46 of the work-riding device is keyed to a shaft 48 the opposite ends of which are supported by shaft seals 49 and roller bearings 50 in flanges 51, 51 of the portion 41 of member 39. The bearings and seals are held in place and sealed by covers 52, 52 secured to the flanges 51 by screws 53. The arm 46 is limited in its downward swing by an adjustable stop 54 consisting of a screw which is threaded to a lug 55 constituting a part of portion 41 of member 39. The screw 54 is secured in adjusted position by a nut 56. By adjusting the stop 54, the lowermost position of the arm 46 may be fixed in accordance with the thickness of the work Y on the table C. Connected to the free end of arm 46 is a frame 57 having spaced portions 58, 58 constituting bearings for the wheels I, I which are adapted to ride on the upper surface of the work Y during the work severing stroke of the carriage F. The frame 57 is connected to the arm 46 by transverse bolts 59 and 60, the arrangement being such that the position of the frame and drag angle of the cutting stream discharged by the blowpipe L, may be adjusted about the axis of the bolt 59.

Mounted on the frame 57 is the bracket K having spaced sleeves 61, 61 through which the cutting blowpipe L extends. The blowpipe L is secured in adjusted axial position by clamps 62, 62 on the sleeves. Each clamp consists of annular jaws 63 and 64 fitting a transverse hole 65 in the bracket K, a screw 66 threaded to the jaw 64 and extending through the jaw 63, and a handle 67. The jaws 63 and 64 have curved blowpipe engaging surfaces, as shown in Fig. 6. To prevent the blowpipe L from slipping downwardly from adjusted position in the sleeves 61, a split collar 68 is secured to the blowpipe by a bolt 69 and engages the top of the upper sleeve. The pilot light burner N is secured to the bracket K in axially adjusted position by a lever 70 and screw 71 threaded to a socket in each of the sleeves 61. The auxiliary preheat blowpipe M is also secured in axially adjusted position on the bracket K.

The pneumatic device O includes a heat insulating shield 72 for the cylinder 42, which protects the latter from the heat of the work Y, if at a rolling temperature, and from the heat resulting from the operation of the blowpipes and thermochemical reaction of an oxidizing gas stream with ferrous metal during the cutting operation.

Mounted on the support A within a housing 13 having a hinged cover 14 is a panel 73, Fig. 7, which supports a cooling water supply conduit 74, a preheat acetylene conduit 75, a preheat oxygen conduit 76, a cutting oxygen conduit 77, a compressed air supply conduit 78, and a cooling water outlet conduit 79. The cooling water supply conduit 74 and outlet conduit 79 are connected to a jacket of the cutting blowpipe, and the water circulates through the jacket and prevents the blowpipe from overheating in use, the supply of cooling fluid to the jacket being controlled by a valve 80 in the supply conduit 74. Also mounted on the panel 73 are a preheat acetylene valve 81, a preheat oxygen valve 82, a cutting oxygen valve 83, a preheat oxygen pressure regulator 84, and a compressed air valve 85. The latter is connected to the cylinder 42 of the pneumatic device O by a blowpipe raising conduit 86 and a lowering conduit 87, the supply of compressed air being controlled by a valve 88 in the conduit 78. A pilot light acetylene conduit 89, and an auxiliary preheat acetylene conduit 90, and an auxiliary preheat oxygen conduit 91, Fig. 1, may also be medially supported by the panel 73, but they are omitted from Fig. 7 to avoid confusion. The pilot burner N is provided with a needle valve 92, and the cutting torch L is provided with an acetylene needle valve 93, a preheat oxygen valve 94, and a cutting oxygen valve 95, Fig. 3.

As shown in Fig. 7, the preheat oxygen line 76 and the cutting oxygen line 77 are provided with separators 96 and 97; while the preheat acetylene line 75 is provided with a hydraulic back pressure valve 98. The cutting oxygen line 77 is also provided with a cutting oxygen pressure regulator 99 having a handle 100 and an indicator 101 on the control table or board S. The board S also contains eight manually operable push-buttons 102, 103, 104, 105, 106, 107, 108 and 109 for controlling suitable electrical circuits to start or stop the carriage 31, to purge the cutting blowpipe lines of residual gases, to inch forward or reverse the carriage 31, and to start or stop the cutting stroke of the carriage F. The cutting machine No. 1 may be duplicated by the machine No. 2, as shown, with respect to the conveyor C, in which case each cutting machine is provided with a similar control board S. The carriages of each cutting machine are energized by the common motor-generator set VT to secure uniform cutting speeds.

As shown in Fig. 8, the generator T is mechanically coupled to the motor V to provide the desired motor-generator set. The motor V, shown by way of example, is a 3 horsepower, 3-phase, 60 cycle, 220/440 volt alternating current type motor. The circuit of the motor V includes a starting switch 113 connected to the push-button 102 on the board S, a stopping switch 114 connected to the push-button 103, and a "line-starter" relay 115. The latter is protected by overload relay contacts 116, 116 and operates switches 117 when energized by the closure of the manually operable switch 113, the circuit being energized through a triple-pole knife switch 118 from a suitable source of alternating current supply. Thirty-ampere fuses 119 also protect the circuit of the motor V from damage due to excessive current. Heaters 120, 120 are included in two of the three lines to the motor V for opening the overload relay contacts 116 in the event of an overload. Thus, when the starting button 102 is pushed, assuming the safety switch 118 to be closed, the switch 113 is closed, causing the relay 115 to be energized. This closes switches 117 and causes the motor V to be energized and remain so after the push-button 102 is released. The motor V is de-energized by pushing the stop-button 103, causing the relay 115 to be de-energized. This results in the opening of the switches 117 and the stopping of the motor V.

Figure 9:
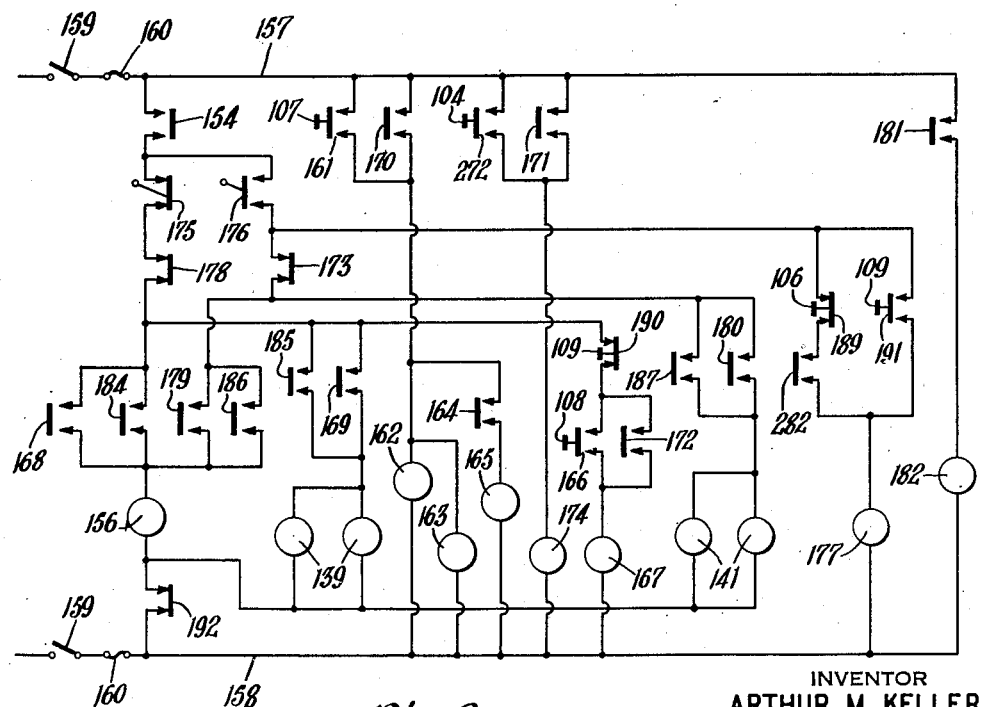
Fig. 9 is a wiring diagram of the control circuit.

The generator T of the motor-generator set is a 230 volt, 2 kilowatt, direct current type generator having a field winding 121 adapted to be energized by the exciter generator U which is also driven by the motor V. The exciter U has a series field winding 123 in the output circuit 124, 125; and a shunt field winding 126 connected to such circuit through an adjustable resistor 127. The output circuit of the exciter U is connected to the input circuit 128, 129 of the generator T through 2-ampere fuses 130, 130. The generator T has a field winding 121 shunted by a 300-ohm field discharge resistor, not shown, and connected to the input circuit through a potentiometer rheostat 132 having a variable tap 133, and a potentiometer 134 having an adjustable tap 135. The maximum resistance of the potentiometer 134 is about 1600 ohms, and that of the potentiometer 132 about 1500 ohms. The variable tap 133 is controlled by the knob R having a "cutting-speed" scale 137 on the control table S, Fig. 7. The circuit to the variable tap 133 includes a switch 138 adapted to be closed when a "cutting" relay 139, Fig. 9, is energized. The circuit to the adjustable tap 135 likewise includes a switch 140 adapted to be closed when a "retraction" relay 141 is energized.

The output circuit 142, 143 of the generator T includes protective fuses 144, 144 and a series field winding 145. Connected to output circuit 142, 143 is the carriage driving motor Q which drives the blowpipe carriage F. The motor Q is a 230-volt, 2-horsepower, reversible direct current type motor having a series field winding 146 and a shunt field winding 147. The latter is connected directly to the generator output circuit 142, 143; while the former is connected to the output circuit through "cutting" switches 148, 148, and "retract" switches 149, 149. When the switches 148 are closed the motor Q drives the carriage across the work in one direction to cut the latter, and when the switches 149 are closed the motor Q drives the carriage in the opposite direction to return it to an initial position. The armature circuit of the motor Q is provided with a dynamic braking resistor 150 around which is shunted a dynamic braking (110 volt) relay 151. Connected across the 230 volt direct current generator output lines 142—143 is the shunt coil of a dynamic braking relay 152 in series with contacts 153 of the auxiliary dynamic braking relay 156. The relays 151 and 152 operate a normally closed switch 154 in the control circuit, Fig. 9; when the relay 151 is energized the switch 154 is opened, when relay 152 is energized then switch 154 is closed. The switch 153 is closed and auxiliary dynamic braking switch 155 in the armature circuit of the motor Q is opened by the energization of an auxiliary braking relay 156 in the control circuit, Fig. 9.

As shown in Fig. 9, the control circuit 157, 158 is connected to a source of 220-volt, 60 cycle, 1- phase, alternating current by switches 159, 159 through 10-ampere fuses 160, 160. The control circuit arrangement is such that when the preheat button 107 is pushed, a preheat switch 161 is closed, energizing a preheat acetylene valve coil 162 which opens the preheat acetylene valve 81. Acetylene thereupon flows through the line 75. At the same time, a preheat time delay relay 163 is energized. After a predetermined time delay switch 164 is closed which causes a preheat oxygen valve coil 165 to be energized. This opens the preheat oxygen valve 82, causing oxygen to flow through the line 76. The preheat oxygen and acetylene are mixed in the blowpipe L (and also in the auxiliary preheating blowpipe M) and the mixed gas jets are ignited by the pilot light burner N. After the lower edge of the ferrous metal work Y is heated to its ignition temperature by these mixed burning gases, the "cut" button 108 is pushed, closing a switch 166 which results in the energization of a "cutting" relay 167. This closes "cutting" switches 168, 169, 170, 171, 172 and opens switch 173. The closure of the switch 168 energizes the auxiliary dynamic braking relay 156 which closes switch 153, Fig. 8. This energizes the relay 152 which opens switch 155. At the same time the closure of switch 169 causes the relays 139, 139 to be energized, closing switches 148, 148, which results in the energization of the driving motor Q and movement of the carriage F across the work Y at a predetermined constant speed depending upon the adjustment of the generator potentiometer through the knob R, Fig. 7.

Closure of the switches 170 and 171 maintains the preheat valve coils 162 and 165 energized and energizes a cutting oxygen valve coil 174. The cutting oxygen valve coil 174 may be energized also by closing a manually operable switch 272 by means of push button 104 in the control circuit. This opens the cutting oxygen valve 83, causing cutting oxygen to flow through the line 77 to the blowpipe L. As the blowpipe L travels above the work Y, the cutting oxygen stream discharged thereby thermochemically severs the work Y. When the blowpipe carriage F reaches the end of its cutting stroke, the limit-switch device X operates, opening a "cutting" limit switch 175. This de-energizes relay 167, causing switches 168, 169, 170, 171 and 172 to open, and switch 173 to close. The preheat and cutting relays are thereupon de-energized and the preheat and cutting gases to the blowpipes are automatically shut-off. At the same time, the carriage driving motor Q is stopped with dynamic braking, relay 177 is energized because limit switch 176 is closed as soon as the carriage F moves away from its furthermost retracted position, opening a switch 178 and closing switches 179, 180, 181 and 282. This causes a relay 182 to be energized, which operates pneumatic valve 85, Fig. 7, causing the blowpipe device H to be elevated above the work Y by the pneumatic elevator O. The "retract" relays 141, 141 are also energized, closing switches 149, 149, Fig. 8, thus energizing the motor Q in a reverse direction to return the carriage F to its initial position, where the "retract" limit switch 176 is opened. "Cutting" limit switch 175 is reclosed immediately as the carriage F moves in the "retract" direction. The control circuit then acts to stop the motor Q, and lower the device H.

The motor Q is energized to "inch" the carriage into a desired position by pushing either the "inch forward" button 105 or the "inch reverse" button 106, Fig. 7. The former (105) is connected to switches 184 and 185 in the control circuit, Fig. 9; and the latter (106) is connected to switches 186, 187 and 189. The term "to inch" is a well known term in the art referring to a control for a motor adapted for manual starting and automatic stopping in response to its movement, so that the advance is by only a small increment each time a button is pressed, or it may be a movement requiring the starting button to be held when stopping occurs on removal of the finger. In each type of inching apparatus the control is manual and for the purpose of moving something only a small amount without danger of overrunning. The "stop" button 109 is connected to switches 190 and 191 in the control circuit so that the motor Q will run in the "retract" direction to drive carriage F to its fully retracted position. Also, all gases are shut off. The control circuit is provided with a safety switch 192 which is adapted to be opened by an overload resistor 193 connecting the input circuit of the motor Q to the output circuit 142, 143 of the generator T.

Briefly, the sequence of operation is as follows: For initiating a cut, the blowpipe unit G is brought to the starting position by operating the "inching" buttons 105 and 106. Then, with the unit G in proper preheat position, the preheat gases are turned on by depressing the "preheat" button 107. The blowpipe L being in lowered position, with the wheels I in contact with the upper edge of the plate Y, the resulting preheat flames impinge on the lower corner of the plate and also on the upper edge of the plate. After the work has been properly preheated, the "cut" button 108 is pressed. This simultaneously turns on the cutting oxygen and starts the motor Q in the forward direction at the selected cutting speed. When the cut is completed, automatic operation of the limit switch 175 causes all gases to be shut off, the blowpipe unit G to be raised to a position spaced above the top of the conveyor table C, and reverses the motor Q at its maximum speed. Upon the blowpipe unit G reaching its fully retracted position, automatic operation of the limit switch 176 stops the motor Q, and causes the blowpipe unit G to be lowered to an initial position outside of the roll table C, completing the operating cycle of the machine.

By the use of the common motor-generator set VT, and a separate carriage driving motor Q for each machine No. 1 or No. 2, supplied with current therefrom, the cutting speed of all of the machines is regulated by the single field rheostat W in the input circuit of the generator T, which results in fixing the voltage applied to the input circuits of the driving motors Q, Q. Thus, the cutting speeds of the machines are substantially the same, although each is otherwise individually operated. Thus, any desired number of machines may be used for the drop-off production cutting of steel slabs or plate sections whose width is substantially greater than their thickness. The invention is applicable to the cutting of either hot (rolling temperatures) or cold (room temperatures) steel where an oxy-fuel gas preheat mixture is used, and the line of cut may be at right angles or at an oblique angle to the roll line.

I claim:

1. The combination with a roll conveyor table along which elongated hot metal work is adapted to be moved, of the improvement for cutting the hot work transversely at longitudinally spaced locations to shorten the time during which the work is stopped, with minimum distortion of the cut ends of the work, and without requiring a separate operator for each blowpipe, said improvement comprising a cutting blowpipe at each spaced location, a transverse beam at each such location from which the blowpipe is suspended, a separate support for each transverse beam, each blowpipe having a device for preheating the work before each cutting blowpipe begins its operation, separate mechanism on each beam for moving each blowpipe transversely of the work, means for supplying gas to each blowpipe, mechanism for automatically cutting off the gas supply from the blowpipes in response to completion of a cutting operation, means for retracting each blowpipe transversely of the cut work, and manually controlled mechanism for beginning a cutting cycle of each blowpipe, each manually controlled mechanism including a push button controlled inching device for actuating the blowpipe whereby one or more or all of the blowpipes may be inched substantially simultaneously in either direction along its supporting beam, to bring the plurality of blowpipes into starting position irrespective of whether or not the work may be laterally bent out of alignment, the controls of each of said manually controlled mechanisms being juxtaposed for actuation closely together in time by an operator in one position, whereby the movement of the work along the roll table is expedited by having fewer stops for cutting.

2. The combination according to claim 1 in which the support for each blowpipe supporting beam is arranged on the same side of the roll table as each other such support.

ARTHUR M. KELLER.

REFERENCES CITED

The following references are of record in the file of this patent:

UNITED STATES PATENTS

| Number | Name | Date |
|---|---|---|
| 520,748 | Bancroft | May 29, 1894 |
| 644,666 | Day | Mar. 6, 1900 |
| 696,247 | Leonard | Mar. 25, 1902 |
| 934,301 | Geist | Sept. 14, 1909 |
| 1,479,989 | Harris | Jan. 8, 1924 |
| 1,773,712 | Wiard | Aug. 19, 1930 |
| 1,972,372 | Borden | Sept. 4, 1934 |
| 2,143,969 | Biggert, Jr. | Jan. 17, 1939 |
| 2,214,571 | Baston et al. | Sept. 10, 1940 |
| 2,223,452 | Jones et al. | Dec. 3, 1940 |
| 2,277,054 | Anderson | Mar. 24, 1942 |
| 2,283,346 | Bucknam et al. | May 19, 1942 |
| 2,293,853 | Rountree | Aug. 25, 1942 |
| 2,317,239 | Yoch | Apr. 20, 1943 |

FOREIGN PATENTS

| Number | Country | Date |
|---|---|---|
| 262,986 | Great Britain | Oct. 7, 1926 |